US011138902B2

United States Patent
White et al.

(10) Patent No.: US 11,138,902 B2
(45) Date of Patent: *Oct. 5, 2021

(54) INCIDENT EXERCISE IN A VIRTUAL ENVIRONMENT

(71) Applicant: Lawrence Livermore National Security, LLC, Livermore, CA (US)

(72) Inventors: Gregory K. White, Livermore, CA (US); William H. Dunlop, Livermore, CA (US); TR Koncher, Brentwood, CA (US); Steve Kreek, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/834,907

(22) Filed: Mar. 30, 2020

(65) Prior Publication Data

US 2020/0226950 A1 Jul. 16, 2020

Related U.S. Application Data

(63) Continuation of application No. 14/592,854, filed on Jan. 8, 2015, now Pat. No. 10,650,700.

(51) Int. Cl.
*G09B 19/24* (2006.01)
*G09B 5/02* (2006.01)

(52) U.S. Cl.
CPC .............. *G09B 19/24* (2013.01); *G09B 5/02* (2013.01)

(58) Field of Classification Search
CPC . G09B 19/24; G09B 9/00; G09B 5/02; G09B 7/00; G09B 23/00; G09B 23/28; G08B 21/10; G08B 21/21; F41A 33/04
See application file for complete search history.

(56) References Cited

U.S. PATENT DOCUMENTS

| 4,752,226 | A | * | 6/1988 | Akers ...................... G09B 9/00 |
| | | | | 434/11 |
| 5,722,835 | A | | 3/1998 | Pike |
| 5,800,333 | A | | 9/1998 | Liprie |
| 6,254,394 | B1 | | 7/2001 | Draper et al. |
| 6,539,311 | B1 | | 3/2003 | Berger |
| 6,912,429 | B1 | | 6/2005 | Bilger |
| 8,284,065 | B2 | | 10/2012 | Gonzales |
| 9,547,998 | B2 | * | 1/2017 | Sadeh-Koniecpol ........ |
| | | | | G06F 21/562 |
| 10,650,700 | B2 | | 5/2020 | White et al. |

(Continued)

*Primary Examiner* — Robert J Utama
(74) *Attorney, Agent, or Firm* — Perkins Coie LLP

(57) ABSTRACT

An incident simulation system supports an incident exercise in a virtual environment. The incident simulation system accesses a simulation plan defining an incident within a theater of operation. The incident simulation system simulates the incident exercise by displaying, to a participant in the incident exercise, images representing what the participant would see within the theater of operation as the participant moves within the theater of operation. The incident simulation system further simulates the incident by generating incident data indicating effects of the incident at target locations and at target times as the participant moves within the theater of operation. The incident simulation system further simulates the incident by displaying to the participant images representing the user experience that a detector would provide based on the generated incident data.

23 Claims, 12 Drawing Sheets

(56) References Cited

U.S. PATENT DOCUMENTS

| | | |
|---|---|---|
| 2004/0232323 A1 | 11/2004 | Bosco et al. |
| 2007/0038383 A1 | 2/2007 | Boris et al. |
| 2008/0000377 A1 | 1/2008 | Doyle et al. |
| 2009/0263771 A1 | 10/2009 | Darois et al. |
| 2009/0319058 A1 | 12/2009 | Rovaglio et al. |
| 2010/0323334 A1 | 12/2010 | Goforth et al. |
| 2013/0066609 A1 | 3/2013 | Gilkes |
| 2013/0115587 A1 | 5/2013 | Wang et al. |
| 2013/0125028 A1* | 5/2013 | Pearson .................. G09B 9/00 715/757 |
| 2013/0295538 A1 | 11/2013 | Ambrose |
| 2014/0167953 A1 | 6/2014 | Dunlop et al. |
| 2014/0323157 A1 | 10/2014 | Drukier et al. |
| 2015/0186566 A1 | 7/2015 | Cooper et al. |

\* cited by examiner

Operation 300

| Hazard 301 | Participant 302 | Detector 303 |
|---|---|---|
| Name:<br>Status:<br>Location: | Name: _____<br>Destination: _____<br>Location: | Name:<br>Location: |
| | | UI |
| ⋮ | ⋮ | |

*FIG. 3*

INCIDENT EXERCISE IN A VIRTUAL ENVIRONMENT

CROSS-REFERENCE TO RELATED APPLICATION

This application is a continuation of U.S. patent application Ser. No. 14/592,854, filed on Jan. 8, 2015, which is hereby incorporated by reference in its entirety.

STATEMENT REGARDING FEDERALLY SPONSORED RESEARCH

The United States government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Many types of materials represent a significant hazard to people, equipment, buildings, and so on. Such hazardous materials may include biological, chemical, and radioactive materials, among others. When a hazardous material incident occurs, an effective response is needed to minimize the harmful effects of the incident. For example, when a hazardous biological material is released into the atmosphere, the first indications of the incident may be reports by people of unusual bodily conditions (e.g., watery eyes and difficulty breathing). When first responders (e.g., members of a hazmat team) arrive at the scene of an incident, the first responders seek to identify the hazardous material. The first responders may have various detectors available to assist in identifying the hazardous material. These detectors may include spectrometers, radiation detectors, seismometers, and so on.

Although the detectors for detecting hazardous materials can be effective at detecting the presence of hazardous materials, the detectors can be complex devices whose effective use may require a significant amount of training. For example, before each use some detectors may need to be calibrated, which can be a complicated and error-prone process. Some detectors may display graphs representing characteristics of measurements and leave it up to a person to interpret the graphs as part of identifying the hazardous materials that are present. Although some training may be done in a classroom environment, the most effective training can occur in a field exercise environment with the actual hazardous materials. The use of the actual hazardous material, however, can present many problems such as exposing the participants in the exercise to the hazardous material, causing long-lasting contamination to the area of the field exercise, and so on. In addition, it can be expensive be transport the participants and equipment to the location of a field exercise. Moreover, it would be impractical to conduct field exercises at certain locations for several reasons, including disruptions to the normal use of those locations, panic in those people who are not aware that the activity is part of an exercise, and so on.

BRIEF DESCRIPTION OF THE DRAWINGS

FIG. 3 illustrates a display page of a user interface presented by an incident control system of the incident simulation system in some embodiments.

DETAILED DESCRIPTION

Figure 1:
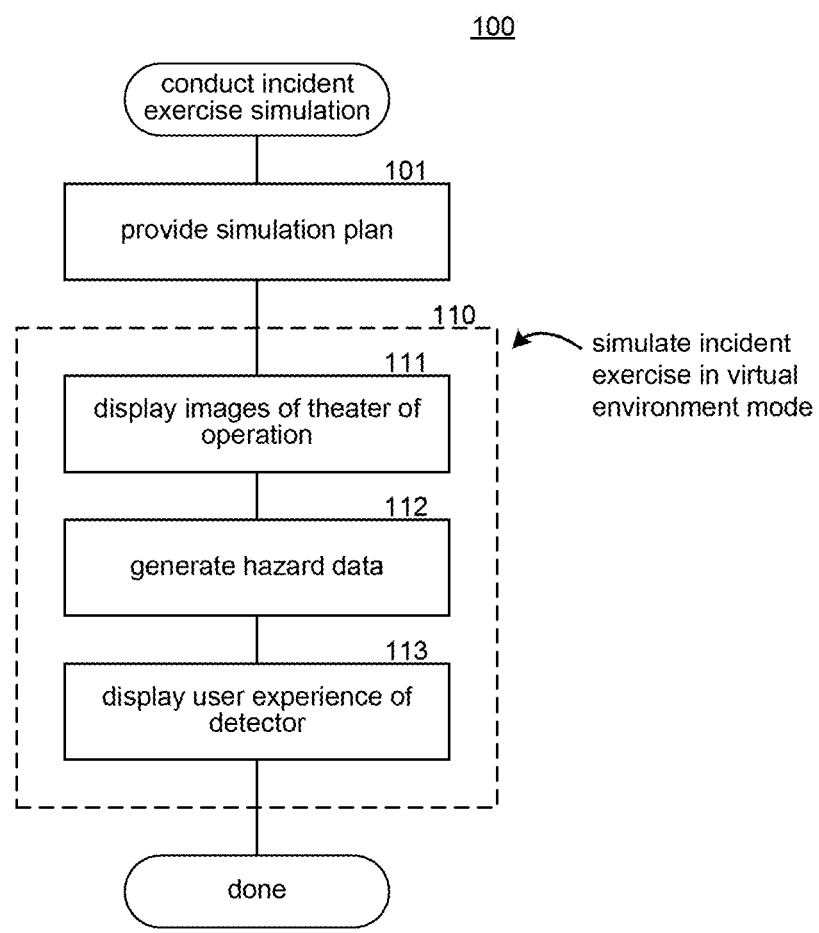
FIG. 1 is a flow diagram that illustrates a component that controls the simulating of an incident exercise in some embodiments of the incident simulation system.

A method and system for administering an incident exercise via a virtual environment is provided. In some embodiments, an incident simulation system administers an incident exercise based on a simulation plan that defines the incident exercise. The simulation plan may specify a theater of operation, the incidents within the theater of operation, detectors for detecting effects of the incidents, and the entities (e.g., people) participating in the incident exercise. For example, a simulation plan specifies the theater of operation, such as the National Mall area in Washington D.C., an international airport such as the Los Angeles International Airport, a cruise ship, and so on. The simulation plan also specifies incidents, such as explosion of a dirty bomb and release of toxic gases (e.g., sarin gas). The simulation plan also specifies detectors, such as certain brands of spectrometers and radiation detectors, that are used in the incident exercise. The simulation plan also specifies entities involved in the incident exercise, such as people, vehicles, and robots.

The incident simulation system implements a simulation plan by generating incident data (e.g., hazard data) indicating effects of the incident at target locations within the theater of operation and at target times. For example, if an incident is the release of a toxic gas, then the incident simulation system may generate the incident data based on a model of the dispersal of the toxic gas at various locations and times given the current environmental conditions (e.g., temperature and wind speed). The incident simulation system may provide a simulated visual experience for the theater of operation that is presented to a participant in the incident exercise, for example, via computer animation, stored videos, or live views of the actual theater of operation. As a participant moves through the theater of operation in the simulated environment, the incident simulation system displays a representation of what the participant would see when moving through the actual theater of operation.

The simulation plan may specify whether the incident exercise is to use real detectors, virtual detectors, or a combination of real and virtual detectors. If a real detector is used, the incident simulation system generates detector signals based on the generated incident data that represent the signals the real detector would encounter in an actual incident. Each real detector may have a training mode in which the signals are received from the incident simulation system rather than the detection hardware of the detector. The incident simulation system then provides the detector signals to the detector for processing as if the detector had actually detected the effects of the incident. If a real detector is used, then the simulated visual experience for the theater of operation may be provided via augmented reality using special glasses that display the visual experience of the theater of operation but allow the participant to hold and see the real detector. If a virtual detector is used, the incident simulation system may also generate a simulated user experience for a detector at a target location and at a target time based on the incident data or the generated signals. The simulated user experience represents the user experience that would be generated when the real detector actually encountered the effects of the incident represented by the incident data.

The incident simulation system may operate in various environment modes ranging from a real environment mode to a virtual environment mode. In the real environment mode, the incident exercise is conducted in the actual theater of operation with real detectors. The participants in the incident exercise actually move through the theater of operation and hold real detectors. The incident simulation system tracks the locations of the participant and provides simulated signals to the detectors so that the detectors can present the actual user experience of a real incident. In the virtual environment mode, the incident exercise is conducted in a virtual theater of operation, with images of the actual theater of operation displayed to the participants as they move through the virtual theater of operation. The incident simulation system displays to the participants a representation of the actual user experience (i.e., via a virtual detector) that would be presented by an actual detector. The incident simulation system may provide combinations of the real environment and virtual environment modes. For example, an incident exercise may be conducted in a virtual theater of operation with real detectors. As another example, an incident exercise may have some participants participating via the real environment mode and other participants participating via the virtual environment mode.

FIG. 1 is a flow diagram that illustrates a component that controls the simulating of an incident exercise in some embodiments of the incident simulation system. A conduct incident exercise simulation component 100 controls the overall simulation as defined by a simulation plan in a virtual environment. The component displays images to participants, generates hazard data, and presents a user experience of detectors based on the hazard data. In block 101, the component provides a simulation plan for the incident exercise. In block 110, the component simulates the incident exercise in a virtual environment. In block 111, the component displays images of the theater of operation to participants as the participants move through the theater of operation in the virtual environment. In block 112, the component generates hazard data based on the incidents defined in the simulation plan. The component may generate the hazard data based on the current locations of the participants and detectors in the virtual environment. In block 113, the component displays to the participants the user experience of the detectors used by the participants. The incident simulation may conduct either a time-based or an event-driven simulation. With a time-based simulation, the incident simulation system determines the location of the participants at each time interval, generates the hazard data for the location and time of the interval, and generates the user experience of the detectors. With an event-driven simulation, the incident simulation system detects events (e.g., movement of participants and change in effects of a hazardous material) and updates the simulation displays based on the events.

Figure 2:
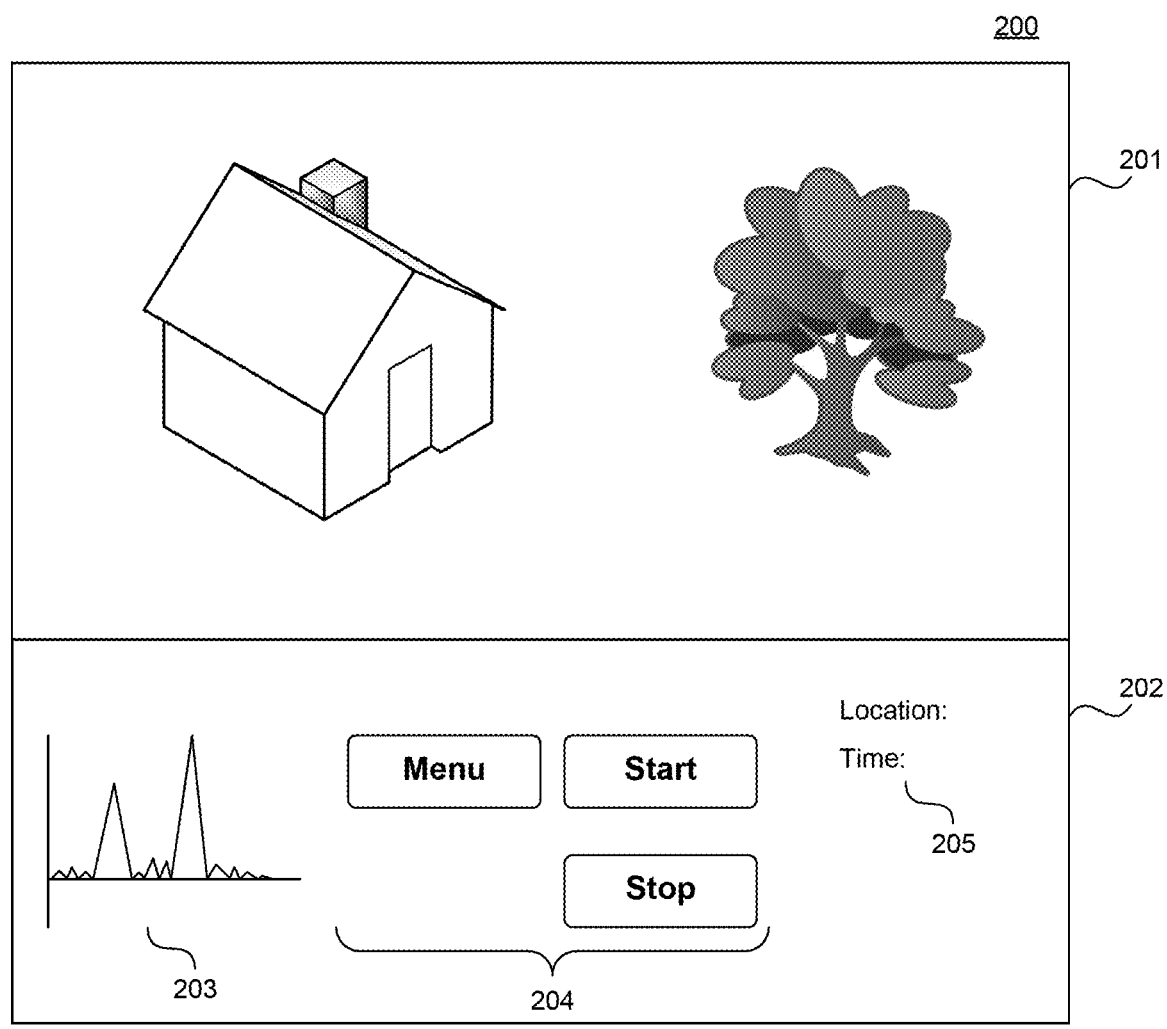
FIG. 2 illustrates a display page presented to a participant in an incident exercise in a virtual environment in some embodiments.

FIG. 2 illustrates a display page presented to a participant in an incident exercise in a virtual environment in some embodiments. A display page 200 may include a theater of operation display area 201 and a detector display area 202. The incident simulation system updates the display of the theater of operation display area as a participant moves through the theater of operation. The participants may indicate their movement through the theater of operation using various input devices such as game controllers, joysticks, walking in place, and so on. The incident simulation system updates the detector display area to present a user experience that is similar to that provided by a detector given the current hazard data at the location of the participant. For example, the detector display area may include a representation of a graph 203, representations of various buttons 204, and location and time information 205 that would be represented by the detector.

FIG. 3 illustrates a display page of a user interface presented by an incident control system of the incident simulation system in some embodiments. The incident control system provides an incident control user interface through which an incident commander can monitor and control an incident exercise. The incident control system may also be used to monitor and control the response to a real incident. The incident control user interface may be presented to a person who is in overall control of the incident exercise. A display page 300 may include a hazard material area 301, a participant area 302, and a detector area 303. The hazard material area displays information related to each of the incidents involving hazardous material of the exercise. For example, the simulation plan may define that a certain hazardous material incident occurs at a certain time and a certain location and has certain characteristics, such as the quantity of the release. The simulation plan may define that another hazardous material incident occurs in a moving vehicle. In such a case, the simulation plan may define the start time of the hazardous incident, the route the vehicle travels, and other characteristics of the incident. In some embodiments, the vehicle may not travel on a fixed route; rather, the route may be controlled by a participant who is driving the vehicle in the virtual environment. The participant area may contain, for each of the participants, information such as the identity of the participant, the current location of the participant, the detector used by the participant, the level of hazardous material exposure to the participant, and so on. The detector area may contain, for each of the detectors, information such as the identity of detector, the location of detector, and the current user experience of the detector. The incident control user interface may also provide a mode in which the display of each participant can be viewed. The incident control user interface may also allow communications (e.g., instant messages or two-way audio) between the person in control of the incident exercise and each of the participants.

Figure 4:
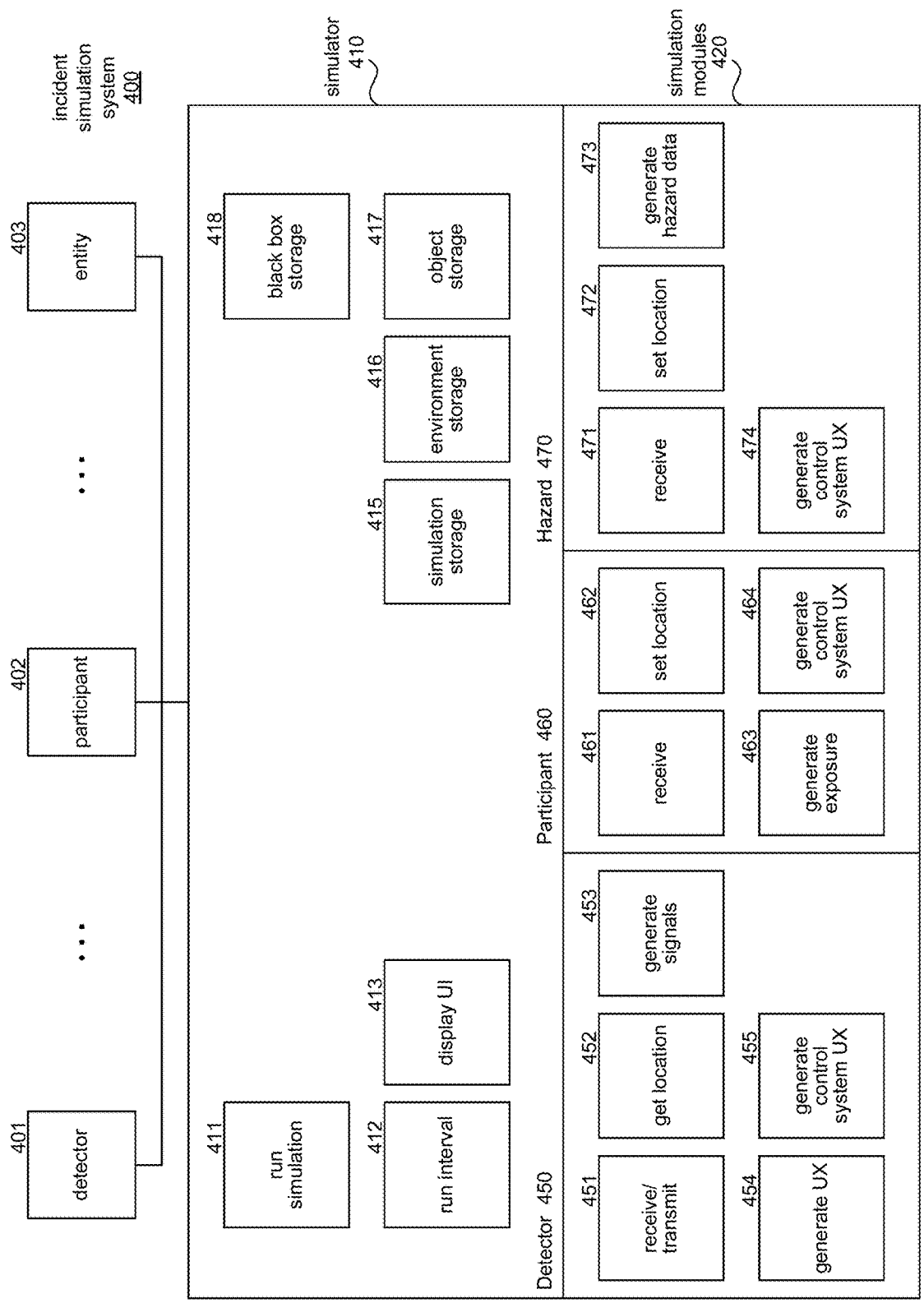
FIG. 4 illustrates an overall architecture of the incident simulation system in some embodiments.

FIG. 4 illustrates an overall architecture of the incident simulation system in some embodiments. The incident simulation system 400 may support both the real environment mode and the virtual environment mode as specified by a simulation plan. The incident simulation system includes detector components 401, participant components 402, and other entity components 403 along with a simulator 410 and simulation modules 420. In the real environment mode, a detector component is part of a real detector and provides to the simulator location information (e.g., data from a GPS or other position system) and receives from the simulator signals generated from the hazard data. The participant component and other entity component provide to the simulator location information indicating the current location of the participant or other entity. These components may also support two-way communications with the incident control system. The detector, participant, and other entity components may not be used in the virtual environment mode. The simulator includes a run simulation component 411, a run interval component 412, and a display user interface component 413, which are described in detail below.

The simulator also includes a simulation storage 415, an environment storage 416, an object storage 417, and a black box storage 418. The simulation storage stores the simulation plan. The environment storage stores information pertaining to the theater of operation. For example, in the virtual environment mode, the environment storage may store data for presenting images (actual or virtual) of the theater of operation, a map of the theater of operation, and so on. The object storage contains information describing characteristics of the objects within the theater of operation. For example, an object may be a building and the characteristics may include the type of building material (e.g., wood or concrete), the thickness of walls, and so on. The incident simulation system may use the characteristics of the objects when generating the hazard data. For example, the incident simulation system may generate different hazard data for a detector depending on whether the detector is currently in a building made of wood or concrete. The black box storage stores data provides a complete history of the actual incident exercise such as hazard data, signals, participant locations, participant interactions with detectors, and so on. The various components of the incident simulation system may store the data generated by the component in the black box storage. The data of the black box storage can be used, for example, to analyze and critique the performance of the participants, identify problems in the generating of hazard data, and so on. In some embodiments, the data of the black box storage can be used to provide a visual replay an incident exercise. This visual replay can be used to train leaders of teams with real world examples of how unanticipated events or untrained team members can affect the decision-making process, educate instructors and/or team members on the causes and effect of decisions, and so on. Such a visual replay may increase the realism and effectiveness of the training.

The simulator interfaces with simulation modules 420 that include detector modules 450, participant modules 460, and hazard modules 470. The detector modules may include a receive/transmit module 451, a set location module 452, a generate signals module 453, a generate user experience module 454, and a generate control system user experience module 455. Each type of detector may have its own detector modules that are specific to that type of detector. The detector modules may interface with the simulator using a common application programming interface that allows for various types of detectors to be used in a simulation. The receive/transmit module receives from a detector location information and transmits to the detector signals generated based on hazard data. The set location module sets the location of a detector when in the real environment mode and when in the virtual environment mode. The generate signals module generates signals for the detector based on hazard data generated for a hazardous material incident. The generate user experience module creates the user experience of the detector for the virtual environment mode. The generate control system user experience module generates the user interface for the incident control system. The generate control system user experience module may invoke the generate user experience module for displaying a representation of the actual user experience of the detector at the incident control system.

The participant modules may include a receive module 461, a set location module 462, a generate exposure module 463, and a generate control system user experience module 464. The receive module receives location information from a location device of a participant. If a participant is holding a detector, then the location information may be received from the detector. Otherwise, each participant (or other entity) may have his own location device. The set location module sets the location for the participant when in the real environment mode and when in the virtual environment mode. The generate exposure module generates data indicating the amount of exposure of the participant to the hazardous materials. The generate control system user experience module provides to the incident control system the user experience for a participant.

The hazard modules may include a receive module 471, a set location module 472, a generate hazard data module 473, and a generate control system user experience module 474. Each type of hazardous material may have its own set of hazard modules. The hazard modules may interface with the simulator using a common application programming interface that allows for various types of hazardous materials to be used in a simulation. The receive module receives location information for the hazardous material, which may be moving in the real or virtual environment modes. If it is moving, the hazardous material may be associated with a means of transportation (e.g., a truck or a person), so the location can be based on the location of the means of transportation. The set location module sets the location for the hazardous material in both the real environment mode and virtual environment mode. The generate hazard data module generates the hazard data for an incident involving the hazardous material based on the characteristics of the incident as specified in the simulation plan. The generate control system user experience module provides to the incident control system the user experience for the hazardous material.

The computing devices and systems on which the incident simulation system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the incident simulation system. The data transmission media is used for transmitting data via transitory, propagating signals or carrier waves (e.g., electromagnetism) via a wired or wireless connection.

The incident simulation system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the incident simulation system may be implemented in hardware using, for example, an application-specific integrated circuit ("ASIC").

Figure 5:
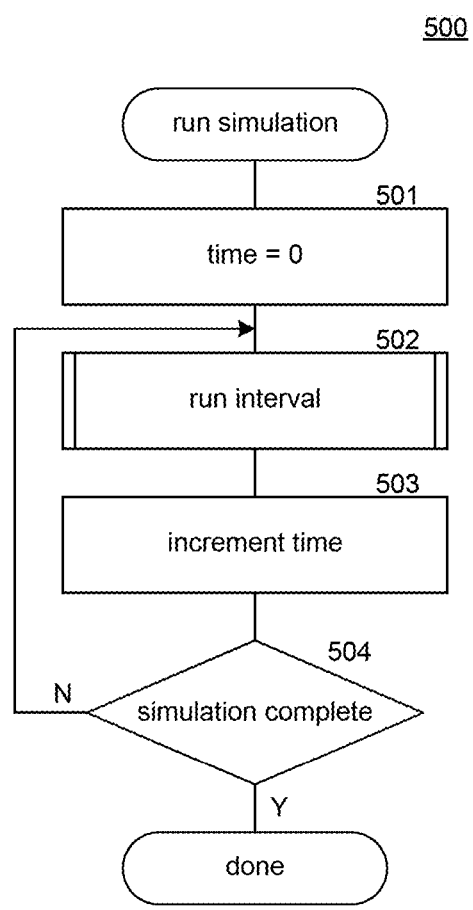
FIG. 5 is a flow chart that illustrates the processing of a run simulation component in some embodiments.

FIG. 5 is a flow chart that illustrates the processing of a run simulation component in some embodiments. In this embodiment, the run simulation component 500 runs a time-based simulation. In block 501, the component initializes the time for the start of the simulation. In block 502, the component invokes a run interval component to run the simulation for the interval at the current time. In block 503, the component increments the time to the next interval. In decision block 504, if the simulation is complete, then the component completes, else the component loops to block 502 to run the simulation for the next interval.

Figure 6:
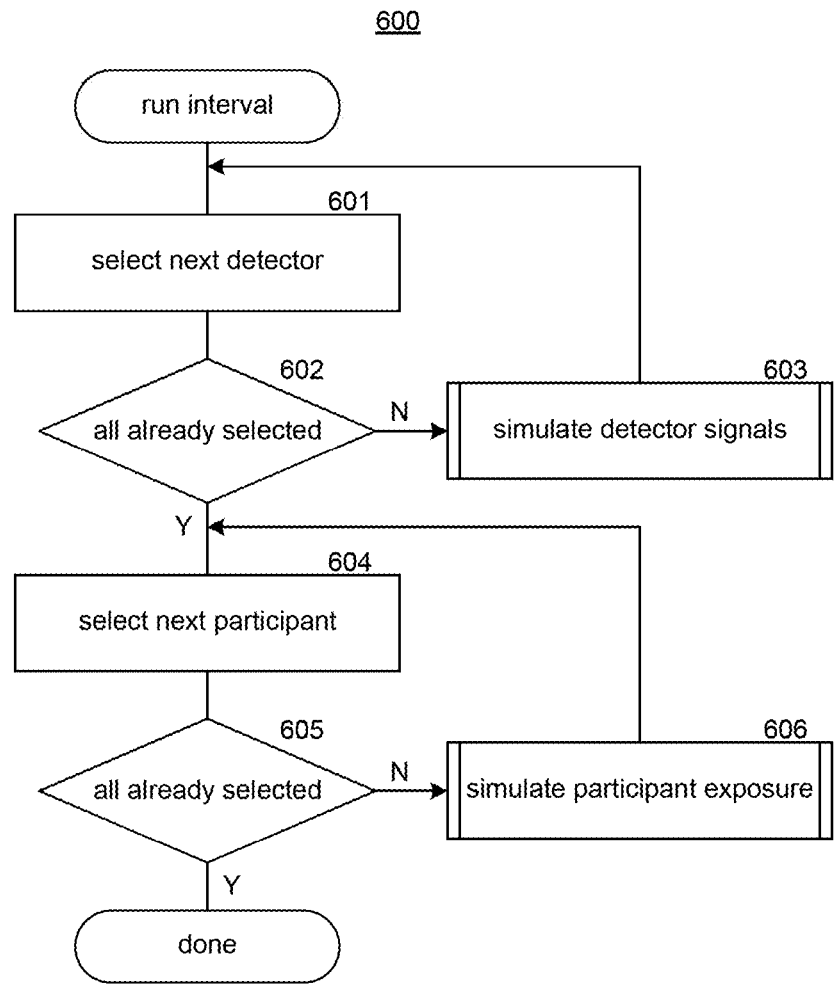
FIG. 6 is a flow diagram that illustrates the processing of a run interval component in some embodiments.

FIG. 6 is a flow diagram that illustrates the processing of a run interval component in some embodiments. The run interval component 600 runs the simulation for the current interval. In blocks 601-603, the component runs the simulation for each detector. In block 601, the component selects the next detector. In decision block 602, if all the detectors have already been selected, then the component continues at block 604, else the component continues at block 603. In block 603, the component invokes a simulate detector signals component for the selected detector and then loops to block 601 to select the next detector. In blocks 604-606, the component runs a simulation for each participant. In block 604, the component selects the next participant. In decision block 605, if all the participants have already been selected, then the component completes, else the component continues at block 606. In block 606, the component invokes a simulate participant exposure component for the selected participant and then loops to block 604 to select the next participant.

Figure 7:
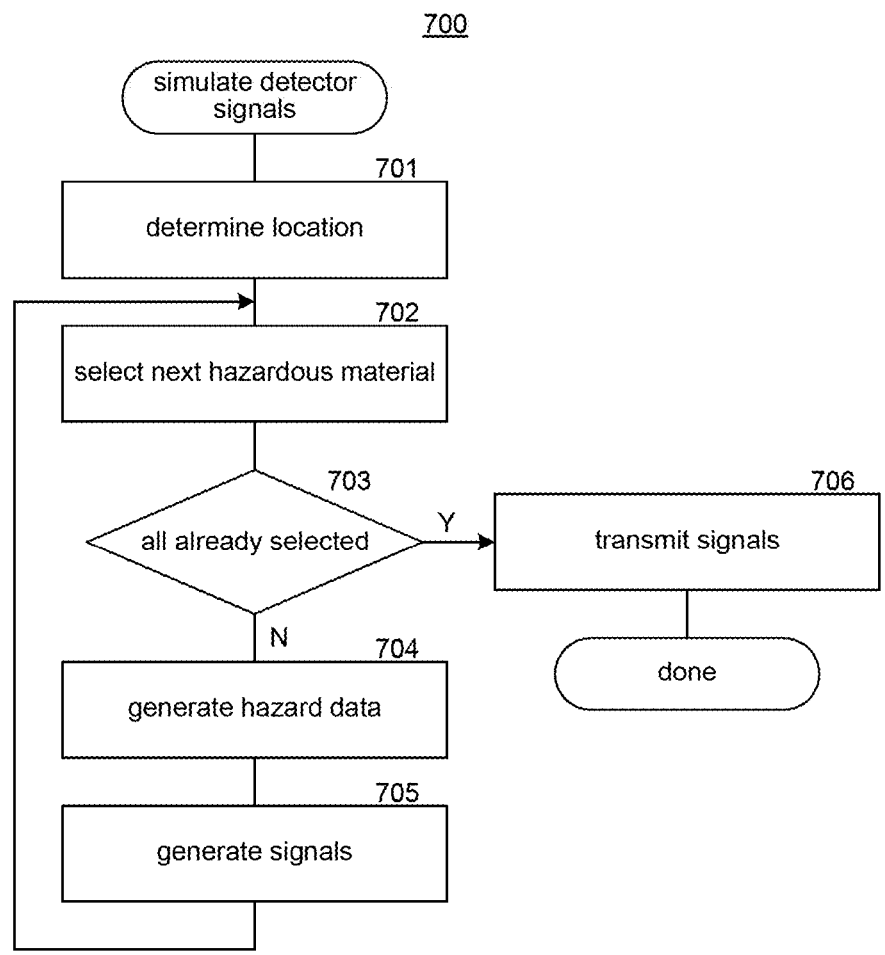
FIG. 7 is a flow diagram that illustrates the processing of a simulate detector signals component of the incident simulation system in some embodiments.

FIG. 7 is a flow diagram that illustrates the processing of a simulate detector signals component of the incident simulation system in some embodiments. The simulate detector signals component 700 is invoked to determine the effects of each hazardous material specified in an incident in the simulation plan on a detector at its current location. In block 701, the component determines and sets the current location of the detector. In block 702, the component selects the next hazardous material. In decision block 703, if all the hazardous materials have already been selected, then the component continues at block 706, else the component continues at 704. In block 704, the component invokes the generate hazard data module of the hazard modules for the type of hazardous material to generate the hazard data that the detector would be exposed to given its current location. In block 705, the component invokes the generate signals module of the detector modules to generate the signals for the detector based on the hazard data. The component then loops to block 702 to select the next hazardous material. In block 706, the component transmits the signals to the detector if a real detector is being used. If a virtual detector is being used, then the generate user experience module of the detector modules generates the user experience based on the generated signals.

Figure 8:
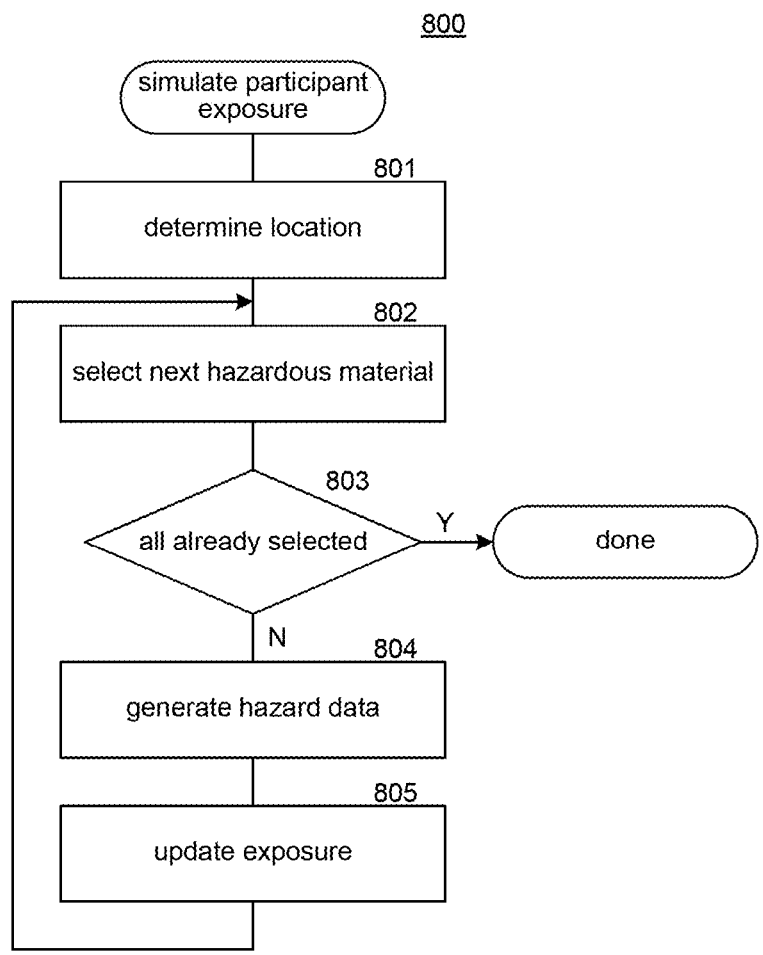
FIG. 8 is a flow diagram that illustrates the processing of a simulate participant exposure component of the incident simulation system in some embodiments.

FIG. 8 is a flow diagram that illustrates the processing of a simulate participant exposure component of the incident simulation system in some embodiments. The simulate participant exposure component 800 is invoked to determine the cumulative effects on a participant of each hazardous material specified in an incident of the simulation plan. In block 801, the component determines and sets the current location of the participant. In block 802, the component selects the next hazardous material. In decision block 803, if all the hazardous materials have already been selected, then the component completes, else the component continues at block 804. In block 804, the component invokes the generate hazard data module of the hazard modules for the type of the selected hazardous material to generate the hazard data that the participant would be exposed to given the participant's current location. In block 805, the component updates the cumulative exposure of the participant to the selected hazardous material based on the hazard data and then loops to block 802 to select the next hazardous material.

Figure 9:
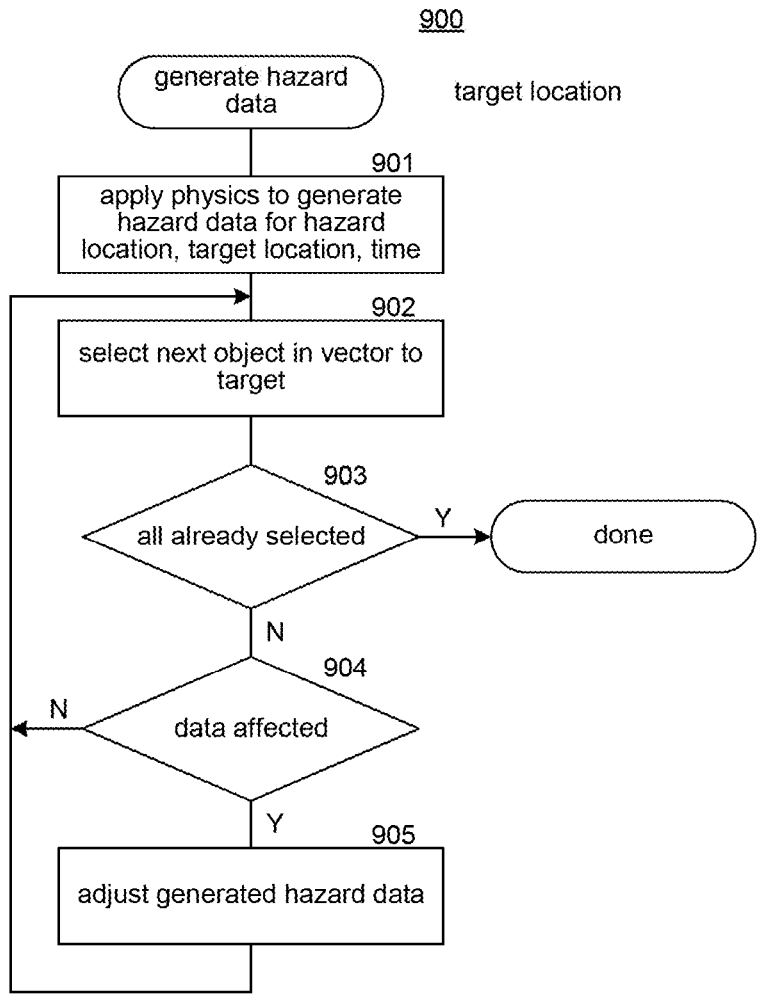
FIG. 9 is a flow diagram that illustrates the processing of a generate hazard data module for a hazardous material in some embodiments.

FIG. 9 is a flow diagram that illustrates the processing of a generate hazard data module for a hazardous material in some embodiments. The generate hazard data module 900 is invoked to generate the hazard data for a target location based on an incident involving the hazardous material. The module factors in the characteristics of the incident such as incident time, incident location, incident strength, and so on. If the incident location is not fixed, then the modules factors in the route or path of the incident. The module also factors in the presence of objects in the theater of operation that may have an effect on the hazard data. For example, the module may factor in the effect of a concrete structure when the target location is within the concrete structure and the incident location is outside the concrete structure or vice versa. In block 901, the module applies a physics-based algorithm to determine the hazard data at the target location. For example, the physics-based algorithm may factor in the rate of decay of the hazardous material, distance between the target location and the incident location, time between the incident time and the current time, actions taken to reduce the effects of the hazardous materials, and other factors that may affect the effects of the hazardous material. In blocks 902-905, the module loops factoring in the effects of those objects, if any, that are in between the incident location and the target location. If an object can move (e.g., a vehicle), the module factors in the current location of the object. In block 902, the module selects the next object in a path from the incident location to the target location. In decision block 903, if all such objects have already been selected, then the module completes, else the module continues at block 904. In decision block 904, if the hazard data is affected by the presence of the selected object, then the module continues at block 905, else the module loops to block 902 to select the next object. In block 905, the module adjusts the generated hazard data to account for the presence of the object and then loops to block 902 to select the next object.

Figure 10:
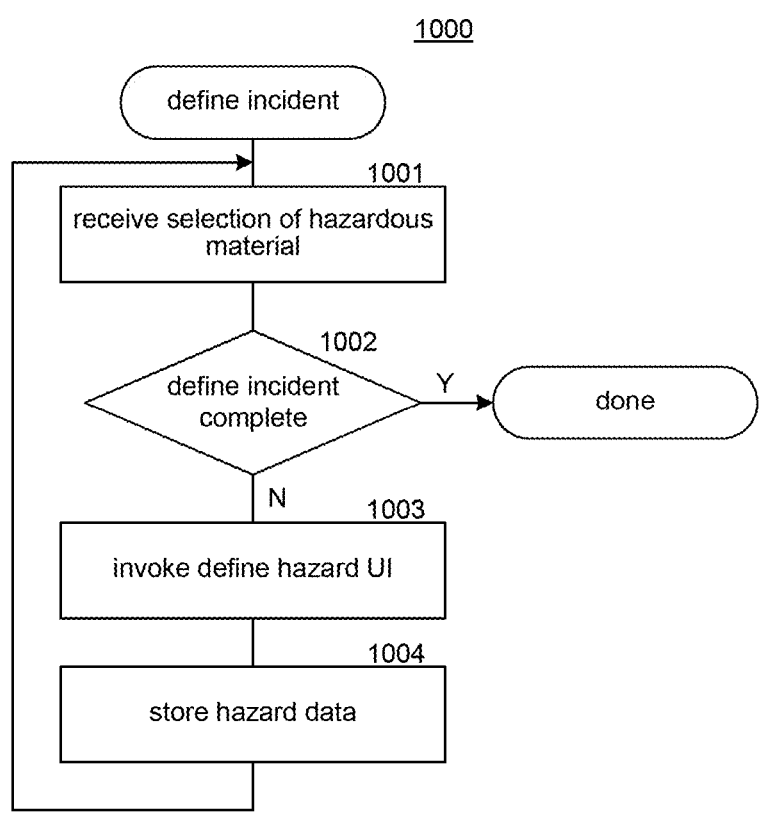
FIG. 10 is a flow diagram that illustrates the processing of a define incident component of the incident simulation system in some embodiments.

FIG. 10 is a flow diagram that illustrates the processing of a define incident component of the incident simulation system in some embodiments. The define incident component 1000 is invoked during the defining of a simulation plan to define the incidents of the simulation plan. Each type of hazardous material may provide an incident user interface for defining the characteristics involving that hazardous material for an incident. In block 1001, the component receives from a user a selection of a hazardous material of the incident. In decision block 1002, if the defining of the incident is complete, then the component completes, else the component continues at block 1003. In block 1003, the component invokes a define hazard user interface module for the selected hazardous material to specify the characteristics of the incident. In block 1004, the component stores the data specifying the characteristics of the incident for the selected hazardous material as part of the simulation plan and then loops to block 1001 to select the next hazardous material.

Figure 11:
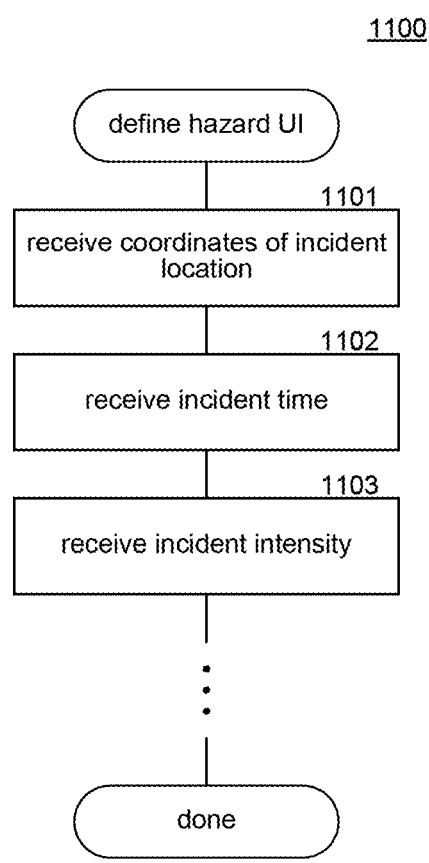
FIG. 11 is a flow diagram that illustrates the processing of a define hazard user interface module for a hazardous material in some embodiments.

FIG. 11 is a flow diagram that illustrates the processing of a define hazard user interface module for a hazardous material in some embodiments. The define hazard user interface module 1100 is invoked to specify the characteristics of a hazardous material involved in an incident. In block 1101, the module receives the coordinates of the incident location. In block 1102, the module receives the incident time for the hazardous material. In block 1103, the module receives the intensity (or other indication of magnitude or strength) of the hazardous material. The component may also receive other information to define the incident, depending on the type of hazardous material. For example, if the incident location is not fixed, then the other information may include an identification of the vehicle transporting the hazardous material, the route of travel of the hazardous material, and so on. The module then completes.

Figure 12:
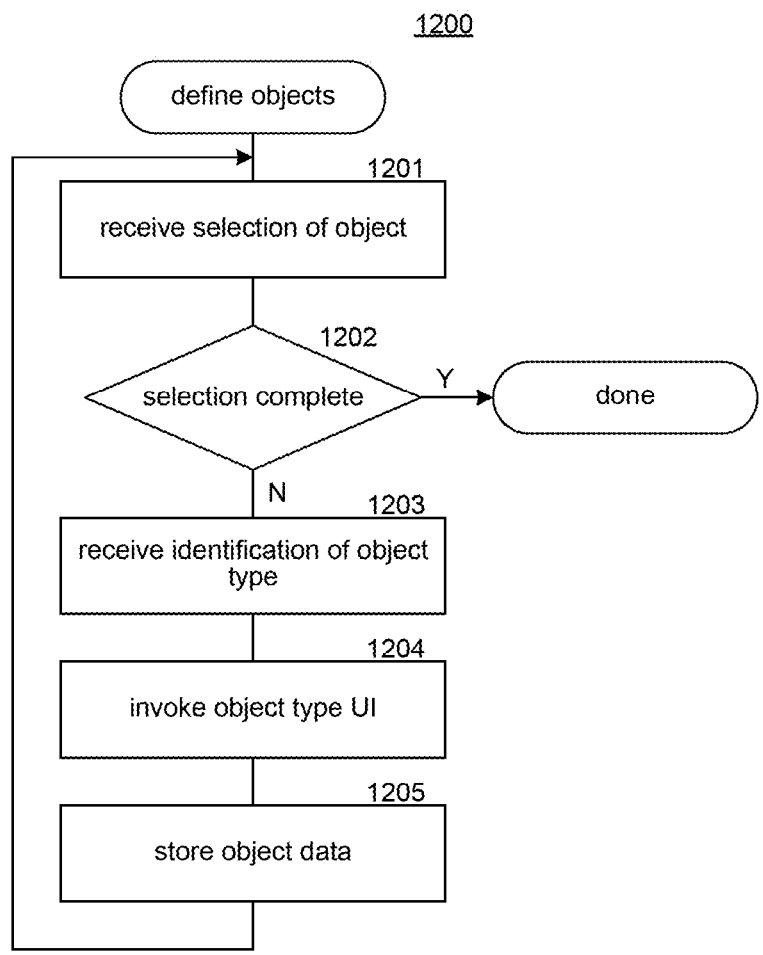
FIG. 12 is a flow diagram that illustrates the processing of a define objects component of the incident simulation system in some embodiments.

FIG. 12 is a flow diagram that illustrates the processing of a define objects component of the incident simulation system in some embodiments. The define objects component 1200 is invoked to define the objects within the theater of operation. The objects may include buildings, walls, vehicles, bridges, and so on. The component may display to a user an indication of the objects that may be defined for the theater of operation. In block 1201, the component receives a selection of an object. In decision block 1202, if the selection of objects has been completed, then the component completes, else the component continues at block 1203. In block 1203, the component determines the type of object. In block 1204, the component invokes an object user interface module for the type of the object to input the characteristics of the object. For example, if the object is a building, then the characteristics may include location of the building, dimensions of the building, construction material, and so on. In block 1205, the component stores the characteristics of the object as part of the simulation plan and then loops to block 1201 to select the next object.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, the incident simulation system may be used with incidents that do not involve material that is considered to be hazardous. For example, the incident may be related to an avalanche in a ski area with the incident designed exercise to train in locating avalanche victims. The incident simulation system may also be used in a gaming environment in which incidents involving hazardous materials (e.g., resulting from a dirty bomb) need to be identified and assessed so that counter measures can be taken. In such a gaming environment, the incident simulation system may generate the hazard data associated with an incident and provide the user experience for the detectors that are available to the participants in the game. Accordingly, the invention is not limited except as by the appended claims.

The invention claimed is:

1. A method performed by one or more computing systems of an incident simulation system for administering an incident exercise based on a simulation of a hazardous material incident, the method comprising:
   accessing a simulation plan that defines the incident exercise, the simulation plan specifying a type of hazardous material, a theater of operation, and a real detector, the real detector having detection hardware and a training mode, the training mode for receiving detector signals from the incident simulation system and processing the detector signals as if the detection hardware had actually generated the detector signals, so that real detector can present an actual user experience that the real detector would generate had the detection hardware actually generated the detector signals;
   running, based on the simulation plan, the simulation to generate incident data indicating effects of the hazardous material incident at a target location within the theater of operation and at target time;
   generating, based on the incident data, detector signals representing detector signals that the detection hardware would generate if the real detector was at the target location at the target time had the hazardous material incident been an actual hazardous material incident; and
   sending, to the real detector operating in the training mode when the real detector is simulated as being at the target location at the target time, the generated detector signals so that the real detector, upon receiving the real detector signals, can generate and display an actual user interface that the real detector would generate and display had the detection hardware generated the generated detector signals during an actual hazardous material incident.

2. The method of claim 1 wherein the simulation plan specifies a participant who is to hold the real detector during the incident exercise.

3. The method of claim 1 wherein the incident exercise in conducted at the theater of operation with a participant.

4. The method of claim 3 wherein the simulation plan specifies a participant who is to hold the real detector and further comprising determining a location of the participant within the theater of operation when the participant is holding the real detector during the incident exercise so that the generated detector signals can be sent to the real detector when the location indicates that the participant is at the target location.

5. The method of claim 1 further comprising generating, based on the incident data, a simulated user experience to represent the actual user experience and presenting the simulated user experience at an incident control system of the incident simulation system.

6. The method of claim 1 wherein the simulation plan defines a location and a time of the hazardous material incident.

7. The method of claim 1 wherein the simulation plan defines that the hazardous material incident occurs in a moving vehicle and a route for the moving vehicle.

8. The method of claim 1 wherein the simulation plan defines environmental conditions for the theater of operation.

9. The method of claim 1 wherein the simulation plan defines a quantity of hazardous material.

10. The method of claim 1 further comprising generating the simulation plan, the generating including receiving a selection of the hazardous material, receiving coordinates of a location of the hazardous material incident, and receiving an intensity of the hazardous material incident.

11. The method of claim 10 further comprising generating the simulation plan, the generating includes defining objects within theater of operations, the defining including receiving an identification of an object type and a location of the object within the theater of operation.

12. One or more computing systems of an incident simulation system for administering an incident exercise based on a simulation of a hazardous material incident, the one or more computing systems comprising:
one or more computer-readable storage mediums for storing computer-executable instructions for controlling the one or more computing systems to:
generate a simulation plan that defines the incident exercise, the simulation plan specifying a type of hazardous material, a theater of operation, and a real detector, the real detector having detection hardware for generating detector signals when the real detector detects a hazardous material, the real detector having a training mode;
run, based on the simulation plan, the simulation to generate incident data indicating effects of the hazardous material incident at a target location within the theater of operation and at target time;
generate, based on the incident data, detector signals representing detector signals that the detection hardware would generate if the real detector was at the target location at the target time had the hazardous material incident been an actual hazardous material incident; and
send, to the real detector when the real detector is simulated as being at the target location at the target time, the generated detector signals
so that the real detector when operating in the training mode can generate a user interface that the real detector, would generate had the detection hardware generated the generated detector signals during an actual hazardous material incident; and
one or more processors for executing the computer-executable instructions stored in the one or more computer-readable storage mediums.

13. The one more computing systems of claim 12 wherein the computer-executable instructions further control the one or more computing systems to generate the simulation plan, the generating of the simulation plan including receiving a selection of the hazardous material, receiving coordinates of a location of the hazardous material incident, and receiving an intensity of the hazardous material incident.

14. The one more computing systems of claim 12 wherein the computer-executable instructions further control the one or more computing systems to generate the simulation plan to define objects within the theater of operations, the generating of the simulation plan including receiving an identification of an object type and a location of the object within the theater of operation.

15. The one more computing systems of claim 12 wherein the computer-executable instructions further control the one or more computing systems to generate, based on the incident data, a simulated user experience to represent an actual user experience that the real detector would generate had the detection hardware actually generated the detector signals and presenting the simulated user experience at an incident control system of the incident simulation system.

16. The one more computing systems of claim 12 wherein the simulation plan defines a location and a time of the hazardous material incident.

17. The one more computing systems of claim 12 wherein the simulation plan defines that the hazardous material incident occurs in a moving vehicle and a route for the moving vehicle travel.

18. The one more computing systems of claim 12 wherein the simulation plan defines environmental conditions for the theater of operation.

19. The one more computing systems of claim 12 wherein the simulation plan defines a quantity of hazardous material.

20. The one more computing systems of claim 12 wherein the simulation plan specifies a participant who is to hold the real detector during the incident exercise.

21. The one more computing systems of claim 12 wherein the incident exercise in conducted at the theater of operation with a participant.

22. The one more computing systems of claim 21 wherein the simulation plan specifies a participant who is to hold the real detector and wherein the computer-executable instructions further control the one or more computing systems to determine a location of the participant within the theater of operation when the participant is holding the real detector during the incident exercise so that the generated detector signals can be sent to the real detector when the location indicates that the participant is at the target location.

23. The method of claim 1 wherein the user interface provides characteristics of measurements that are based on the detector signals.

* * * * *